June 16, 1942.  R. B. ARNOLD  2,286,888
APPARATUS FOR FUMIGATING
Filed Jan. 21, 1937   3 Sheets-Sheet 1
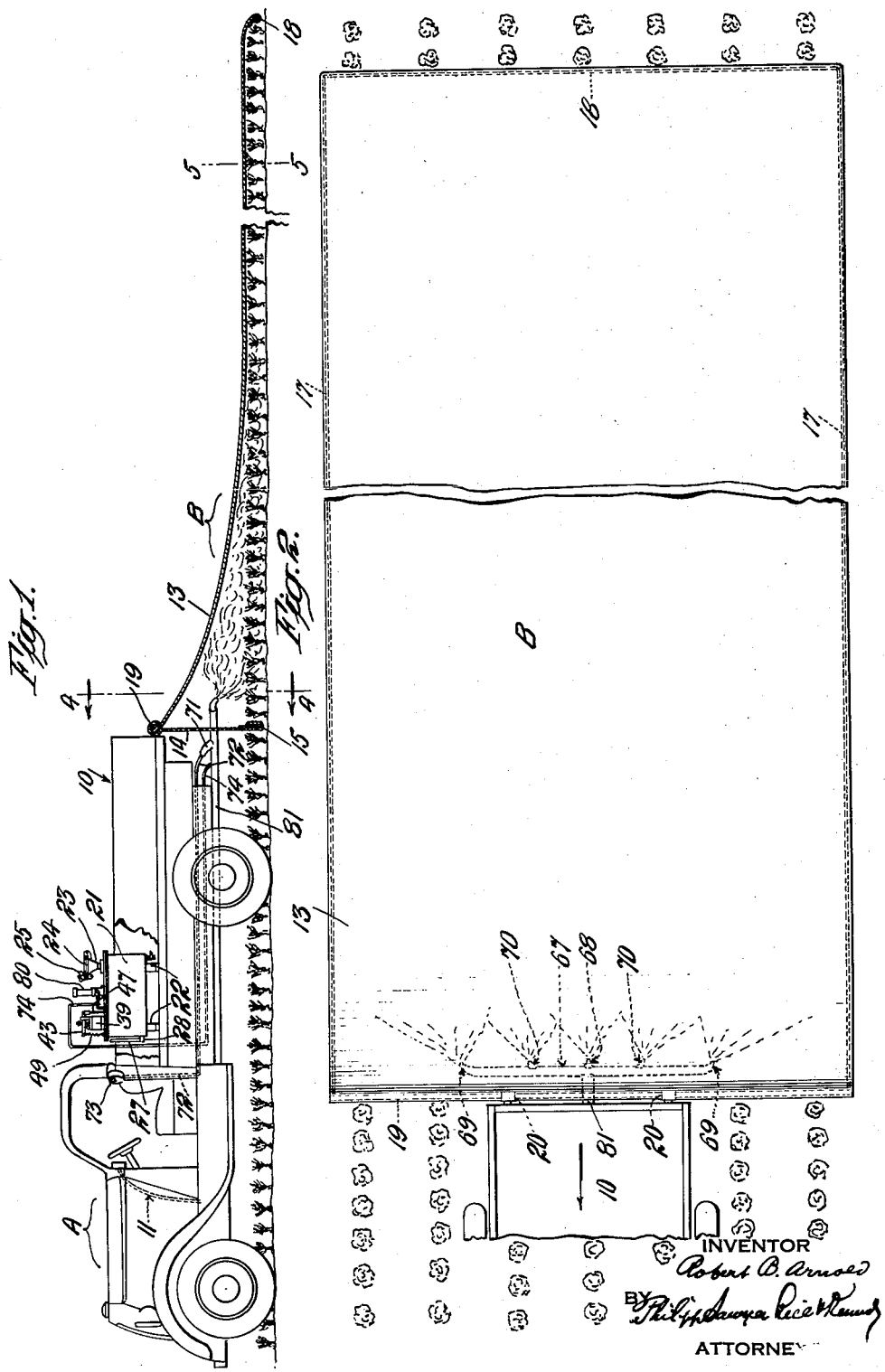

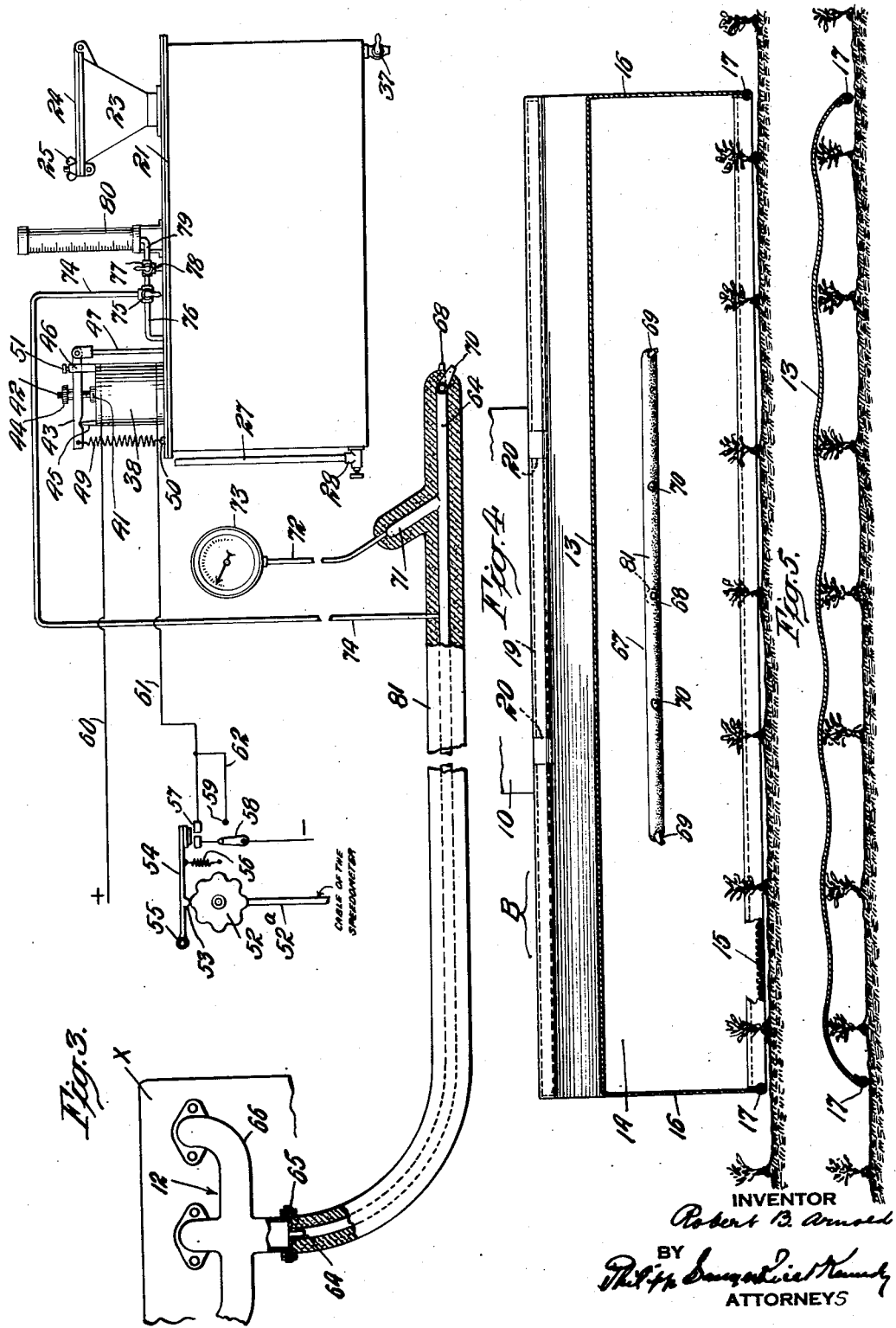

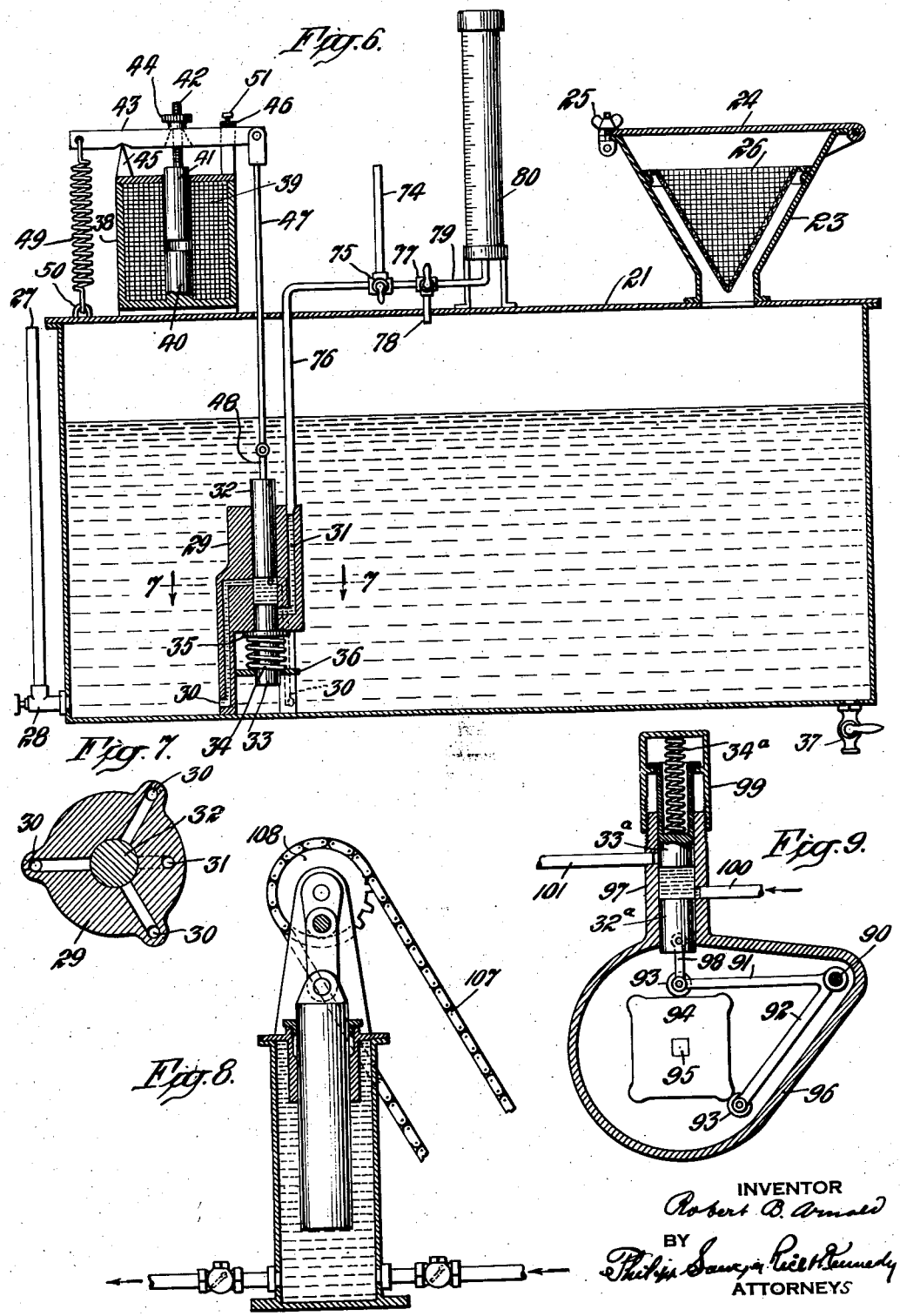

Patented June 16, 1942

2,286,888

UNITED STATES PATENT OFFICE 2,286,888

APPARATUS FOR FUMIGATING

Robert B. Arnold, Stonewall Courts, Va., assignor to Tobacco By-Products and Chemical Corporation, Louisville, Ky., a corporation of Delaware Application January 21, 1937, Serial No. 121,447

4 Claims. (Cl. 21—121)

This invention relates to an apparatus for fumigating plants with fumes containing nicotine, or similar insecticidal material having a boiling point approximately the same as that of nicotine.

The advantage of applying an insecticide in vapor or gaseous form to plants has long been recognized, as, for example, in killing scale insects on citrus fruit trees with hydrocyanic gas, using a tent over the tree during the fumigation, and in the fumigation of plants in greenhouses with nicotine vapors or other similar material to destroy aphis and other insects.

On account of the fact that fumes will reach all parts of the surfaces of plants with certainty, thereby overcoming the disadvantages inherent in dusting or spraying methods which frequently do not reach all such surfaces, and hence leave parts of the plant unprotected, the desirability of a fumigating method for the destruction of insects on plants in the open by the use of nicotine has been considered a desideratum and many attempts have been made to apply nicotine to plants in the open by fumigating methods, but without commercial success. In all such attempts, of course, it is customary to provide a temporary enclosure for the plant, such, for example, as a traveling apron or canopy, in order to restrict the escape of the fumes into the surrounding air and hold said fumes in contact with the plant for, at least, a short time. So far as nicotine fumes are concerned, these prior attempts, even where a canopy or apron has been used, have not satisfactorily accomplished the purpose intended.

As the result of a number of experiments particularly aimed at the destriction of insects, such as the pea aphis, in the field, applicant has found that, by the prior methods and apparatus for producing insecticidal fumes, it was impossible to preduce a sufficient concentration of nicotine in the fumes when working in the open with the usual enclosing means, such as a canopy, tent, apron, or like temporary enclosure intended to hold the fumes in contact with the plant, not only because there is a relatively rapid escape of fumes from and admission of air to the interior of the enclosing means, but also, and what is more important, because there is an inherent impossibility of obtaining, by prior methods, a sufficiently high concentration of nicotine to kill the insects quickly. Even when applying nicotine to plants in tightly closed spaces, such as greenhouses, the results have not been satisfactory, except where the fumes were retained in contact with the plants for a relatively long time.

The object of the present invention is to provide an apparatus for producing, and applying to plants, a nicotine fume which will immerse those insects sensitive to nicotine in fumes having such a relatively high concentration of nicotine that the destruction of such insects, or a very high percentage thereof, is assured in the limited time they are within the temporary enclosure, and to aid in explaining the operation of the apparatus, it will be described in connection with its use for treating plants with a suitable fumigant, and also as applied to carrying out a method of fumigation which includes the production of what may be termed chiefly nicotine gas, to distinguish it from mere vapor, by heating the nicotine above its boiling point, the combination of such nicotine gas, before, after or during gasification, with a suitable diluent, most advantageously a hydrocarbon, which is vaporized, the nicotine gas and the vapor of the diluent being discharged as a mixture which is then further diluted by the atmosphere and comes into contact with the plants to be fumigated, the proportion of nicotine gas in the mixture as it is discharged being relatively very high, so that when the mixed fumes are further diluted by the atmospheric air and other fumes within the temporary enclosure, the final concentration of nicotine in the resultant mixture is high enough to insure the requisite high percentage of kill of the insects attacked and thereby make the fumigation a success.

The invention comprises an apparatus particularly suitable and economical for carrying out the method above, one form of such apparatus being illustrated in the accompanying drawings, in which:

Fig. 1 is a side elevation, partly in section, of an automobile fumigating apparatus embodying the invention.

Fig. 2 is a plan view, rear partly broken away, of the rear portion of the apparatus shown in Fig. 1.

Fig. 3 is a detail view, somewhat diagrammatic, and partly in section, of the essential parts of the apparatus for producing and distributing the fumigating gas and vapors.

Fig. 4 is a vertical section on the line 4—4, Fig. 1.

Fig. 5 is a similar view on the line 5—5, Fig. 1.

Fig. 6 is a vertical sectional view, partly in elevation, and on an enlarged scale, of the tank and the devices carried by it.

Fig. 7 is a horizontal section on the line 7—7, Fig. 6.

Fig. 8 is a vertical sectional view, partly in elevation, of a modification of the pumping apparatus.

Fig. 9 is a similar view of another modification of such pumping apparatus.

Referring to the drawings, and more particularly to Figs. 1 and 2, A indicates an automobile, here shown as a truck of any usual construction, the engine or motor, X, Fig. 3 as shown, being, as usual, an internal combustion engine, with a manifold for the exhaust ports and having a speedometer driving mechanism for a speedometer shaft, or cable.

The body of the truck is indicated at 10, and the speedometer flexible shaft in dotted lines, at 11. The exhaust manifold is illustrated in Fig. 3 at 12.

At the rear end of the truck body is attached a temporary enclosure, B, for field plants, for example, peas, this enclosure being in the form of an apron or canopy of airtight flexible material, such as woven fabric impregnated or coated with a suitable elastic composition, usually a rubber compound. The apron or canopy has a top, 13, a flexible front wall, 14, having a pocket at its lower end containing a rope, or chain, 15, to serve as a weight which will tend to keep the bottom of the front wall close to the ground, and two side walls, 16, Fig. 4, also provided at the lower edge with pockets containing means for weighting the lower edges, usually rope or chains, 17. The extreme rear end of the apron also is provided with a pocket containing rope or chain, 18. At the line where the top, 13, meets the top of the front wall, 14, there is formed a pocket through which passes a bar or rod, 19, passing through and held fixedly by loops or eyes, 20, Fig. 4, which are connected in any suitable way at the rear end of the body of the truck. The length of the apron is such that at a predetermined rate of travel of the truck, said apron will enclose a plant for about two-thirds of a minute. The width of the apron may be selected with more freedom than the length of it, being somewhat related to the size and power of the truck. An apron 100 feet long and about 20 to 30 feet wide is generally used for a truck of the type termed a one and a half ton truck, to travel about one and a half miles per hour while doing the fumigating. This will enable about three to five acres per hour to be fumigated, which is entirely satisfactory in practice but impossible of attainment with the weak nicotine fumes heretofore tried.

Suitable means for discharging fumes having a relatively very high nicotine content is provided. This comprises a tank for carrying a supply of nicotine of the proper kind, or a liquid composition, essentially nicotine, means for supplying the nicotine at a predetermined rate, and means for rapidly heating the nicotine above the boiling point to form a fume which is largely gaseous nicotine and for discharging the nicotine within the temporary enclosure. The best embodiment of the invention includes means for measuring the rate of discharge of the nicotine without loss thereof and means for adjusting the rate of discharge.

The tank, 21, Figs. 1, 3 and 6, is carried by the truck body, being mounted on suitable supports 22. In the best embodiment of the invention, the tank is provided at the top with a filling opening and a filling funnel, 23, which has a lid, 24, hinged to the funnel and arranged to be locked by a swinging bolt having a thumb-nut as indicated at 25, Fig. 6. Within the funnel is detachably mounted a conical strainer, 26, having a flanged margin which rests on a bead formed on the inside of the funnel. The tank also has its front end provided with a vertical tube, 27, of glass, whose upper end is open and whose lower end communicates with the interior of the tank through a suitable valve, 28. Within the tank and secured to its bottom is a pump arranged to discharge the nicotine fumigating material. In the embodiment of the invention shown in detail in Fig. 6, the pump comprises a cylinder, 29, provided with a plurality of inlet ports, 30, three being shown, and with one discharge port, 31. The pump has two pistons, one, 32, of which is positively and regularly reciprocated by a suitable driving means, as more fully explained hereinafter, while the other piston, 33, is spring-pressed, in an upward direction, by means of a spring, 34, bearing against a collar, 35, on the piston and against an abutment and guide plate, 36. When the piston, 32, is at the upper end of the stroke, the inlet ports, 30, are open to the cylinder, and liquid enters the space beneath the piston, 32. At this time the lower piston, 33, is in its extreme uppermost position and closes the discharge port, 31. When the piston, 32, descends, it gradually closes the inlet ports, 30, and traps a constant quantity of liquid in the cylinder. On its further downward movement, it creates a pressure, which acts on the upper face of the lower piston, 33, and drives it downward, against the action of the spring, 34. The downward movement of the lower piston, 33, uncovers the discharge port, 31, and thereafter the further descent of the upper piston, 32, causes the liquid to be forced up the discharge port. The amount of liquid discharged from the cylinder per stroke depends upon the length of travel of the upper piston, 32. For less than full capacity of the pump some liquid travels up and down in the cylinder. At the start of the upward stroke of the upper piston, 32, the lower piston, forced by spring, 34, closes the discharge opening and reaches the end of its upward stroke, which is determined by the fixed position of the collar, 35. The upper piston, 32, continues its upward stroke, creating a vacuum in the cylinder until it uncovers the inlet ports, whereupon liquid is drawn into the cylinder through the inlet ports. Of course, with the pump in the bottom of the tank, as shown in Fig. 6, there is also a gravity feed of liquid to the pump as long as the level of the liquid in the tank is above the upper ends of the inlet ports. As it is customary to fill up the tank before it is entirely emptied, the pump usually operates with a gravity supply to the inlets. At the same time at the last of the operations, when it is desired to empty the tank completely, the pump will suck up, that is, lift the remaining liquid, due to the vacuum formed. By keeping the exterior openings of the inlet ports as close to the bottom of the tank as is possible, the tank may be practically emptied, and any remaining liquid may be drawn off through a drain cock, 37.

The upper pump piston may be reciprocated in any suitable way, but in the best embodiment of the invention, an electric solenoid and plunger device is advantageously employed. This comprises an iron-clad solenoid, whose iron jacket is indicated at 38, Fig. 6, its solenoid winding at 39, its fixed core at 40, and its reciprocating plunger at 41. The plunger has a screw-threaded stem, 42, passing through a hole in the lever, 43, and provided with a thumb-nut, 44, above the lever and resting thereon, the contacting face of the nut being rounded and the lever correspondingly cupped to receive the rounded part. The hole in the lever, 43, is formed to give a clearance about the stem, whereby the angular movement of the lever is permitted while the stem moves in a vertical line, only.

The lever, 43, is fulcrumed in any suitable way. As illustrated, it has a knife-edge fulcrum post, 45, fixed to the top of the iron jacket, 38, of the solenoid. The lever, 43, is guided, close to one end, by a stirrup-shaped guide, 46, also fixed to the top of the iron jacket, 38, this end of the lever, 43, being connected to the upper piston, 32, by a pitman, 47, pivotally connected to the lever, 43, and to a stem, 48, carried by the said piston, 32.

The lever is pulled down by the plunger, 41, when the coil, 39, is energized, and is raised by a tension spring, 49, connected to the lever at its end remote from the pitman connection, and also connected to an eye, 50, fixed to the top of the tank.

The limit of the stroke of the upper piston, 32, in an upward direction, may be adjusted by means of an adjusting screw, 51, carried by the stirrup-guide, 46, which, when once set so that piston, 32, clears inlet ports, 30, remains fixed. By adjusting the thumb-nut, 44, the range of the downward movement of the plunger, 41, may be determined and, therefore, that of the upper piston, 32.

The solenoid coil, 39, is included in an electric circuit arranged to be energized by a suitable source of electricity and to have pulsations of current through it. In the present embodiment of the invention, the circuit is energized from the usual storage battery provided for the ignition and starting apparatus of the truck, this battery not being shown. Within the circuit is included a circuit interrupter of any suitable kind. In the present embodiment of the invention the circuit interrupter comprises a rotary cam, 52, Fig. 3, which is driven by the flexible shaft, 52a, usually employed to drive the speedometer, whose meter is removed. The cam has a plurality of cam projections arranged to contact with a stud or nose, 53, carried by a contact lever, 54, pivoted at 55, and urged toward the cam by a spring, 56. The contact lever is arranged to open and close the circuit through a pair of contact devices, 57, which are included in the electric circuit. In addition a switch, 58, is provided which will open the circuit between the source of electricity and the contact device, 57. This switch may be swung to engage a contact device, 59, included in a shunt which by-passes the contact devices, 57. The usual circuit wires are indicated at 60 and 61, the shunt wire being indicated at 62.

When the truck is traveling in the field the flexible shaft, 52a, is revolved, as usual, and thereby the cam 52, is rotated in proportion to the distance traveled by the truck, whereby the electric circuit to the solenoid is energized by a pulsatory current, the number of pulsations in a unit of time being directly proportional to the distance traveled by the truck in the same time, and consequently the pump piston, 32, is reciprocated by the solenoid plunger at a rate also proportional to the rate of travel of the truck. As each discharge stroke of the pump discharges a uniform predetermined quantity of liquid, it follows that the liquid discharge from the pump is directly proportional to the distance traveled by the truck.

The manual switch, 58, not only permits the circuit to be opened when desired, but, also, provides a means for a manually controlled operation of the pump at any rate desired, merely by moving the switch, 58, into and out of contact with the contact device, 59. This makes it possible to utilize the apparatus for fumigating trees with the truck standing still and its motor running.

For the purpose of converting into fumes the liquid delivered by the pumping mechanism, a suitable heating means is provided. In order to accomplish the purposes of this invention, it is important that this heating means be so arranged that it will heat a sufficient quantity of the liquid to a temperature above the boiling point of nicotine (478° F.) in order to develop a fume which is chiefly nicotine in a gaseous condition, as distinguished from mere vapor, and, more particularly to do this at a relatively low cost.

While it is possible to utilize the exhaust from an internal combustion engine for heating purposes, applicant has found that under normal conditions of operation and with the usual exhaust pipes provided for automobile vehicles, it is not possible to gasify a sufficient quantity of nicotine to provide a concentrated atmosphere beneath the temporary enclosure of the required cubic contents. Therefore, in order to accomplish the required results, a special exhaust pipe is provided for the internal combustion engine of the truck. This exhaust pipe constitutes a retort and ejector. It differs from the ordinary exhaust pipe in having a much smaller diameter, which, of course, tends to create a somewhat higher pressure, and also reduces the radiating surface. It also is heavily insulated in order to maintain the temperature within the pipe. In the best embodiment of the invention shown in Fig. 3, the exhaust pipe, 64, is provided with a wide flange, 65, at the end which is connected to the usual manifold, 66, of the internal combustion engine by suitable bolts. In practice it has been found that an exhaust pipe of one inch internal diameter is entirely satisfactory and even a half inch pipe may be used without injuriously affecting the operation of the engine by too great a back pressure, where the ordinary exhaust pipe would have an internal diameter of about 1½ to 2 inches.

At the discharge end of the exhaust pipe there is provided a header, 67, which carries a series of nozzles, which, in the best embodiment of the invention, project in different directions, so as to distribute the discharged fumes and quickly form a mixture of the fumes with the atmosphere within the apron or other temporary enclosure. In the structure illustrated there is provided a nozzle, 68, at the center of the header, arranged to discharge fumes along a substantially central line and slightly downward. At each end of the header there is a nozzle indicated at 69 which discharges in an outward and downward direction. Between the central nozzle, 68, and each end nozzle, 69, there is an intermediate nozzle, 70, which discharges in an outward and downward direction, but at a lesser angle than that of the end nozzles.

Suitable means is provided for ascertaining the temperature near the end of the exhaust pipe. In the present embodiment of the invention the exhaust pipe is provided with a dead end branch pipe, 71, in which a suitable thermometric device may be fixed, this being connected through a tubing, 72, with a suitable indicator, 73. The details of the thermometric device are not shown, as such devices are well known and in commercial use. It is, of course, to be kept in mind that the thermometric device shall be one which is reasonably accurate at temperatures up to or around 575° F. at least.

The exhaust pipe is supplied with the fumigating liquid through a suitable tube or pipe 74, Figs. 3 and 6, controlled by a three-way cock, 75, at the end of a pipe, 76, which is connected to the discharge port, 31, of the pump. The cock, 75, is connected to another three-way cock, 77, which is connected to two pipes, 78 and 79, the former discharging into the tank, and the latter, 79, discharging into the bottom of a transparent graduated measuring cylinder, 80, supported on the tank, this cylinder having its upper end open to the air. By suitable arrangement of the cocks, 75 and 77, the pump discharge may be sent out through the tubes or pipes, 76 and 74, to the exhaust pipe, 64, or for purpose of testing may be sent into the cylinder, 80, where the rate of discharge of the pump may be measured by observing the quantity pumped in a given distance traveled. This permits adjustment of the length of stroke of the pump piston, 32, to be made so as to obtain the desired rate of discharge of the liquid to the exhaust pipe. When this has been done, the cock, 75, may be turned to send the liquid to the exhaust pipe, and the cock, 77, may be turned to allow the liquid in the measuring cylinder, 80, to flow back to the tank. If desired the cocks 75 and 77, may be set so as to allow the pump to run and discharge back to its tank.

As hereinbefore stated, in order to obtain as high a temperature as possible in the exhaust pipe, 64, the latter, as well as the branch, 71, is provided with a very heavy thermal insulating jacket, indicated at 81. This is an important feature, since the source of heating, viz: the exhaust gases from the engine, are not normally hot enough by the time they reach the end of an exhaust pipe, such as normally employed, to maintain the temperature required by applicant for gasification of the nicotine. With the small exhaust pipe and the heavy insulating jacket employed in applicant's invention, it is possible to obtain the required temperature by retarding the spark of the ignition device, to a limited extent, and this is possible without seriously affecting the operation of the internal combustion motor, while driving the truck relatively slowly across a field.

With an apparatus such as hereinbefore described, the operator, after preliminary test and proper adjustment of the pump discharge, may drive across a field containing the plants to be fumigated, and apply a fumigating atmosphere of a high nicotine concentration to the crop.

A modified form of pumping apparatus to be used outside the tank is illustrated somewhat diagrammatically in Fig. 9. This pump is intended to be located just below the floor of the cab of the truck and is driven by the rigid speedometer shaft, as distinguished from the flexible shaft, or cable. In this construction, the spring-pressed piston is uppermost, and the power-driven piston is below it. The latter is reciprocated by a bell crank device pivoted at 90 and having two arms 91 and 92, each provided with a roller, 93, these rollers being arranged to make contact with a cam, 94, mounted on a shaft, 95, driven from the internal combustion engine of the truck, in the manner stated above.

The cam and bell-crank device are enclosed in a housing, 96, which supports the pump cylinder 97. The piston, 32a, is connected to the upper arm, 91, of the bell-crank device by a pitman, 98. The upper piston, 33a, is hollow at its upper end to receive the spring 34a, which bears at one end against the piston, 33a, and at the other end against a tubular adjusting nut, 99, threaded onto the outside of the pump-cylinder, 97. By turning the nut, the tension of the spring may be adjusted. The inlet port of the pump is connected to a tank by means of a pipe, part of which is indicated at 100.

The discharge port is connected by a pipe, 101, to the exhaust pipe in substantially the same way as was the pipe 76 of the construction shown in Fig. 6. It will be noted that in this modification the tubular nut, 99, has a ledge or internal rib which serves to limit the downward movement of the piston 33a and thereby determines the amount of liquid drawn in by the pump at each stroke. Hence, by adjusting the nut not only is the spring pressure adjusted but also the quantity of liquid discharged is determined. The operation of the fumigating apparatus with this type of pump is substantially the same as with the apparatus shown in Fig. 6, which has been explained fully hereinbefore.

In Fig. 8 is illustrated another type of pump which may be used in some cases. This type of pump is a common plunger pump arranged to be driven by a sprocket chain, 107, which passes around the sprocket wheel, 108, fixed to the crank shaft of the pump and also around a sprocket wheel (not shown) suitably driven by the truck engine. With this type of pump, it may be mounted on a bracket on the body of the truck and driven from a sprocket wheel which, if desired, may be fastened to one of the vehicle wheels (not shown).

In order to utilize the apparatus most efficiently and obtain successful results with certainty, applicant has devised a fumigating composition consisting of substantially anhydrous nicotine with some water-free liquid petroleum hydrocarbon, the nicotine being in the larger proportion. In practice the nicotine is present to the extent of about 75 to 80% of the fumigating composition and the liquid petroleum hydrocarbon about 15 to 20%. There is usually present about 1 to 5 percent of non-aqueous impurities in the nicotine, these consisting of gums, or resins. Such a fumigating composition is non-corrosive and also acts as a lubricant for the pump. When it is discharged in a small amount into a heated retort, such as the exhaust pipe, hereinbefore shown and described, it is so rapidly heated that the liquid hydrocarbon, which contains at least one fraction whose boiling point is below that of nicotine (478° F.) immediately evolves a hydrocarbon vapor serving to form a protective atmosphere for the nicotine which, on account of the high temperature of the exhaust gases in the exhaust pipe, is quickly converted into the form of gas, as distinguished from mere vapor, and because of the hydrocarbon vapor, is protected against oxidation by any oxygen or moisture which may be present in the exhaust gases coming from the manifold of the internal combustion engine. The mixture of nicotine and liquid petroleum is not admitted to the exhaust pipe until after the truck engine has been running for a sufficient time, with the spark retarded, if necessary, to produce a temperature of at least 500° F. at the outer or discharge end of the exhaust pipe, as shown by the indicator of the thermometric device which, it is to be noted, is located close to the discharge end. This assures an efficient use of the nicotine so that the fumes ejected from the nozzles are at a high temperature and rich in nicotine gas. The fumes are well distributed within the atmosphere enclosed by the temporary enclosure and this distribution takes place while the nicotine is still in gaseous form so that a fine particle fume is produced. Therefore, even though the subsequent cooling is relatively rapid, the nicotine is so thoroughly distributed that it does not tend to coalesce into drops of liquid which will fall out from the atmosphere. The rate of supply of nicotine to the temporary enclosure is such that the concentration of nicotine in the atmosphere within such enclosure is from five to ten times that usually employed in greenhouses when fumigating plants therein, namely, about 2.5 to 5 lbs. of nicotine per 100,000 cubic feet of space. This rate of supply is determined roughly by the dimensions of the apparatus, but can be regulated to a considerable extent by adjustment of the stroke of the pump.

The fumes produced as above described are entirely satisfactory so far as insecticidal value is concerned. However, these fumes may be only faintly visible and not continuously so. As it is an advantage to have fumes which are permanently and plainly visible, thus enabling the operator to control better the fumigating operations, the fumigating composition in its best embodiment contains a small amount of smoke-producing material which will not injure the nicotine. For this purpose a liquid petroleum hydrocarbon having a boiling point between 700° and 800° F. is highly satisfactory. In usual practice the anhydrous nicotine is combined with a liquid petroleum composition which is free from water and which has fractions such that the distillation range of the mixture extends from about 400° F. to about 800° F., the proportion of those fractions whose boiling points lie between 700° and 800° F. being small compared with the lower boiling fractions.

Some suitable fumigating compositions are as follows:

*Example I*

| | Pounds |
|---|---|
| Anhydrous nicotine containing 98% nicotine | 82 |
| Mineral seal oil, 500° F.-700° F. | 16 |
| Light lubricating oil, 700° F. and above | 2 |

Another very satisfactory formula is as follows:

*Example II*

| | Pounds |
|---|---|
| Anhydrous nicotine containing 98% nicotine | 82 |
| Kerosene, 350° F.-500° F. | 13 |
| Light lubricating oil, 700° F. and above | 5 |

Formulas giving lower visibility are as follows:

*Example III*

| | Pounds |
|---|---|
| Anhydrous nicotine containing 98% nicotine | 82 |
| Mineral seal oil | 18 | and

*Example IV*

| | Pounds |
|---|---|
| Anhydrous nicotine containing 98% nicotine | 82 |
| Mineral seal oil | 9 |
| Kerosene | 9 |

The term anhydrous nicotine as here used includes any nicotine which contains less than 1% of water. In practice, it is practicable to obtain nicotine having as low as 0.35 to 0.45% water.

Since the liquid petroleum hydrocarbons have a low latent heat of vaporization as compared with water, the heat supply furnished by the exhaust of an ordinary automobile truck when used in applicant's apparatus is sufficient to heat up the liquid composition well above the boiling point of nicotine and thereby largely gasify it.

It will be noted that in the apparatus shown, the exhaust pipe constitutes a gasifying retort which can be heated to a temperature above the boiling point of nicotine before the nicotine fumigating composition is admitted to it, and it is important that this temperature be maintained close to the discharge end of the exhaust pipe. Therefore, as the nicotine composition is delivered to the gasifying retort in liquid form and in a relatively small stream, it is rapidly and almost immediately heated to a temperature above the boiling point of nicotine, so that the hydrocarbon protective vapor or gas is formed almost immediately and in immediate contact with the nicotine, which is gasified so quickly thereafter, that there is practically no time or opportunity for any oxidation or other chemical action on the nicotine, by any reacting gases or vapors, so that the nicotine can be substantially all gasified and thereby diffused in gas form without the injury and decomposition which otherwise might result from such high temperatures.

Furthermore, it will be noted that there is a pressure somewhat above atmospheric in the gasifying retort, and the temperature is such as to be enough above the boiling point of nicotine at atmospheric pressure to cause it to gasify under said slight superpressure. Also, as a result of said pressure, the nicotine while still substantially all in gaseous form is swept out of the exhaust pipe through the nozzles and well distributed in the atmosphere beneath the temporary enclosures before it has had time to cool to vapor form, so that when it does cool it is so thoroughly disseminated that it cannot coalesce to large drops and fall out of the fumigating atmosphere.

In cases where the internal combustion engine cannot furnish sufficient heat to accomplish the desired results hereinbefore set forth, any suitable source of external heat may be provided, either an electric heating coil surrounding the retort portion of the exhaust pipe and energized from a suitable source, such as a generator on the truck, or a gasoline torch, or compressed gas burner, whose flame plays on the outer wall of the exhaust pipe, the insulating jacket at one section over the retort portion being removed to allow access of the flame to the said wall. Or, a second internal combustion engine may be placed on the body of the truck and run idle at relatively high speed, the exhaust gases from which are piped to joint the exhaust gases from the engine operating the truck, or which, alone may heat the retort for gasifying the nicotine solution.

No claim is made in this application to the compositions for use in producing the special fumigants or to the method of using fumigants disclosed in this application, such compositions and method being claimed in applicant's Patents No. 2,120,225, issued June 14, 1938, and No. 2,250,943, issued July 29, 1941, respectively.

What is claimed is:

1. In a fumigating apparatus, the combination, with an automotive vehicle having an internal combustion engine mounted thereon, and means for conducting away exhaust gases from said engine, said means including a gasifying chamber, means for maintaining a temperature above the boiling point of nicotine in said gasifying chamber, and means for discharging gases from said chamber in well distributed condition at the rear of the vehicle, of a tank arranged to contain a supply of volatilizable liquid fumigating composition, a pump having a reciprocatory piston, an electromagnetic solenoid having a winding and a reciprocatory plunger, connections between the plunger and the pump piston for operating the latter by the plunger, a connection between the tank and the pump inlet for supplying liquid to the pump, a connection from the discharge side of the pump to the gasifying chamber, a circuit breaker, a source of electricity, a circuit including the winding of the solenoid, the source of electricity, and the circuit breaker, and means actuated only during the travel of the vehicle for operating the circuit breaker whereby the pump discharges the liquid fumigating composition to the gasifying chamber at a rate proportional to the rate of travel of the vehicle, all of said elements, other than the vehicle, being carried by said vehicle.

2. In a fumigating apparatus, the combination, with an automotive vehicle having an internal combustion engine mounted thereon, and means for conducting away exhaust gases from said engine, said means including a gasifying chamber, means for maintaining a temperature above the boiling point of nicotine in said gasifying chamber, and means for discharging gases from said chamber in well distributed condition, of a tank arranged to contain a supply of volatilizable liquid fumigating composition, a pump having a reciprocatory piston, an electromagnetic solenoid having a winding and a reciprocatory plunger, connections between the plunger and the piston for operating the latter by the plunger, a connection between the tank and the pump inlet for supplying liquid to the pump, a connection from the discharge side of the pump to the gasifying chamber, a circuit breaker, a source of electricity, a circuit including the winding of the solenoid, the source of electricity, and the circuit breaker, a switch-controlled shunt path around the circuit breaker for eliminating it from the circuit, and means actuated only during the travel of the vehicle for operating the circuit breaker whereby the pump discharges the liquid fumigating composition to the gasifying chamber at a rate proportional to the rate of travel of the vehicle, all of said elements other than the vehicle being carried by said vehicle.

3. In a fumigating apparatus, the combination, with an automotive vehicle, having an internal combustion engine mounted thereon, and means for conducting away exhaust gases from said engine, said means including a gasifying chamber, means for maintaining a temperature above the boiling point of nicotine in said gasifying chamber, and means for discharging gases, while still above the boiling point for nicotine, from said gasifying chamber in well distributed condition, of a tank arranged to contain a supply of volatilizable fumigating liquid, a pump arranged to be supplied from said tank, a transparent measuring vessel, a pipe connection leading from the pump discharge and having two branches, one branch leading to the gasifying chamber and the other leading to the transparent measuring vessel, a valve for directing the flow from the pump to either branch, a pipe connection leading to the tank from the branch to the measuring vessel, and a three-way valve located in the latter branch and arranged to direct liquid to the measuring vessel and to the tank from the pump discharge and to allow drainage into the tank from the measuring vessel and from the branch leading from the pump to the gasifying chamber, according to the setting of the valves, and means for operating the pump when the vehicle is moving, all of said elements other than the vehicle being carried by said vehicle.

4. In a fumigating apparatus, the combination, with an automotive vehicle, having an internal combustion engine mounted thereon, and means for conducting away exhaust gases from said engine, said means including a gasifying chamber, means for maintaining a temperature above the boiling point of nicotine in said gasifying chamber, and means for discharging gases, while still above the boiling point for nicotine, from said gasifying chamber in well distributed condition, of a tank arranged to contain a supply of volatilizable fumigating liquid, a pump arranged to be supplied from said tank, means for adjusting the stroke of said pump, a transparent measuring vessel, a pipe connection leading from the pump discharge and having two branches, one branch leading to the gasifying chamber and the other leading to the transparent measuring vessel, a valve for directing the flow from the pump to either branch, a pipe connection leading to the tank from the branch to the measuring vessel, and a three-way valve located in the latter branch and arranged to direct liquid to the measuring vessel and to the tank from the pump discharge and to allow drainage into the tank from the measuring vessel and from the branch leading from the pump to the gasifying chamber, according to the setting of the valves, and means for operating the pump when the vehicle is moving, all of said elements other than the vehicle being carried by said vehicle.

ROBERT B. ARNOLD.